United States Patent
Kuramochi (10) Patent No.: US 11,750,102 B2
(45) Date of Patent: Sep. 5, 2023

(54) POWER CONVERSION APPARATUS

(71) Applicant: Mitsubishi Electric Corporation, Tokyo (JP)

(72) Inventor: Takuya Kuramochi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/748,585

(22) Filed: May 19, 2022

(65) Prior Publication Data

US 2022/0416670 A1    Dec. 29, 2022

(30) Foreign Application Priority Data

Jun. 23, 2021   (JP) ................... 2021-103719

(51) Int. Cl.
  *H02M 3/335*  (2006.01)
  *H02M 1/34*  (2007.01)
  *H02M 1/00*  (2006.01)

(52) U.S. Cl.
  CPC ..... *H02M 3/33573* (2021.05); *H02M 1/0009* (2021.05); *H02M 1/346* (2021.05)

(58) Field of Classification Search
  CPC . H02M 3/33573; H02M 1/0009; H02M 1/346
  See application file for complete search history.

(56) References Cited

U.S. PATENT DOCUMENTS

| 6,327,165 | B1 | 12/2001 | Yamane et al. |
| 10,374,517 | B2 * | 8/2019 | Tomita ............... H02M 3/3376 |
| 2016/0380563 | A1 * | 12/2016 | Fukuta ............ H02M 7/53871 |
| | | | 318/400.3 |

FOREIGN PATENT DOCUMENTS

| JP | 3484122 B2 | 1/2004 |
| WO | 03/032478 A1 | 4/2003 |

OTHER PUBLICATIONS

Office Action dated Dec. 27, 2022 from the Japanese Patent Office in JP Application No. 2021-103719.

* cited by examiner

*Primary Examiner* — Adolf D Berhane
(74) *Attorney, Agent, or Firm* — Sughrue Mion, PLLC; Richard C. Turner (57) ABSTRACT

A first capacitor is connected between a first connection point and a second connection point. A second capacitor is connected between a third connection point and a fourth connection point. A current sensor is provided between the first connection point and the third connection point. A sum of the third wiring length which is a length of wiring from the first connection point to the third connection point and the fourth wiring length which is a length of wiring from the second connection point to the fourth connection point is smaller than a sum of the first wiring length which is a length of wiring from a first input terminal to the first connection point and the second wiring length which is a length of wiring from a second input terminal to the second connection point.

8 Claims, 5 Drawing Sheets

POWER CONVERSION APPARATUS

BACKGROUND OF THE INVENTION

1. Field of the Invention

This disclosure relates to a power conversion apparatus.

2. Description of the Related Art

In a related-art power conversion apparatus, smoothing capacitors serving as a snubber circuit are connected between a positive electrode and a negative electrode of a switching power module via a connecting wiring board.

The switching power module is supplied with electric power from a DC power source (see, for example, Japanese Patent No. 3484122).

In the related-art power conversion apparatus as described above, a current sensor for detecting an electric current flowing from the DC power source to the switching power module is generally provided between a positive electrode of the DC power source and terminals on the positive electrode side of the smoothing capacitors. Accordingly, the electric current flowing through the switching power module and an electric current flowing through each of the smoothing capacitors flow through the current sensor. For that reason, a large discrepancy occurs between a current value measured by the current sensor and a value of the electric current that actually flows through the switching power module. In other words, the related-art power conversion apparatus causes a problem in that the electric current flowing through the switching power module is not measured accurately.

SUMMARY OF THE INVENTION

This disclosure has been made to solve the above-mentioned problem, and therefore has an object to provide a power conversion apparatus which is capable of suppressing a reduction in accuracy of measuring an electric current flowing through a power conversion unit.

According to at least one embodiment of this disclosure, there is provided a power conversion apparatus including: a first input terminal; a second input terminal; a first output terminal; a second output terminal; a power conversion unit connected to the first output terminal and the second output terminal; a current sensor to detect an electric current flowing from the first input terminal to the first output terminal; a first capacitor connected between a first connection point and a second connection point, the first connection point being provided between the first input terminal and the first output terminal, the second connection point being provided between the second input terminal and the second output terminal; and a second capacitor connected between a third connection point and a fourth connection point, the third connection point being provided between the first connection point and the first output terminal, the fourth connection point being provided between the second connection point and the second output terminal. In the power conversion apparatus, the current sensor is provided between the first connection point and the third connection point, and when a length of wiring from the first input terminal to the first connection point is defined as a first wiring length, a length of wiring from the second input terminal to the second connection point is defined as a second wiring length, a length of wiring from the first connection point to the third connection point is defined as a third wiring length, and a length of wiring from the second connection point to the fourth connection point is defined as a fourth wiring length, a sum of the third wiring length and the fourth wiring length is smaller than a sum of the first wiring length and the second wiring length.

According to the power conversion apparatus of the at least one embodiment of this disclosure, the reduction in accuracy of measuring the electric current flowing through the power conversion unit can be suppressed.

DESCRIPTION OF THE EMBODIMENTS

Now, embodiments of this disclosure are described with reference to the drawings.

First Embodiment

Figure 1:
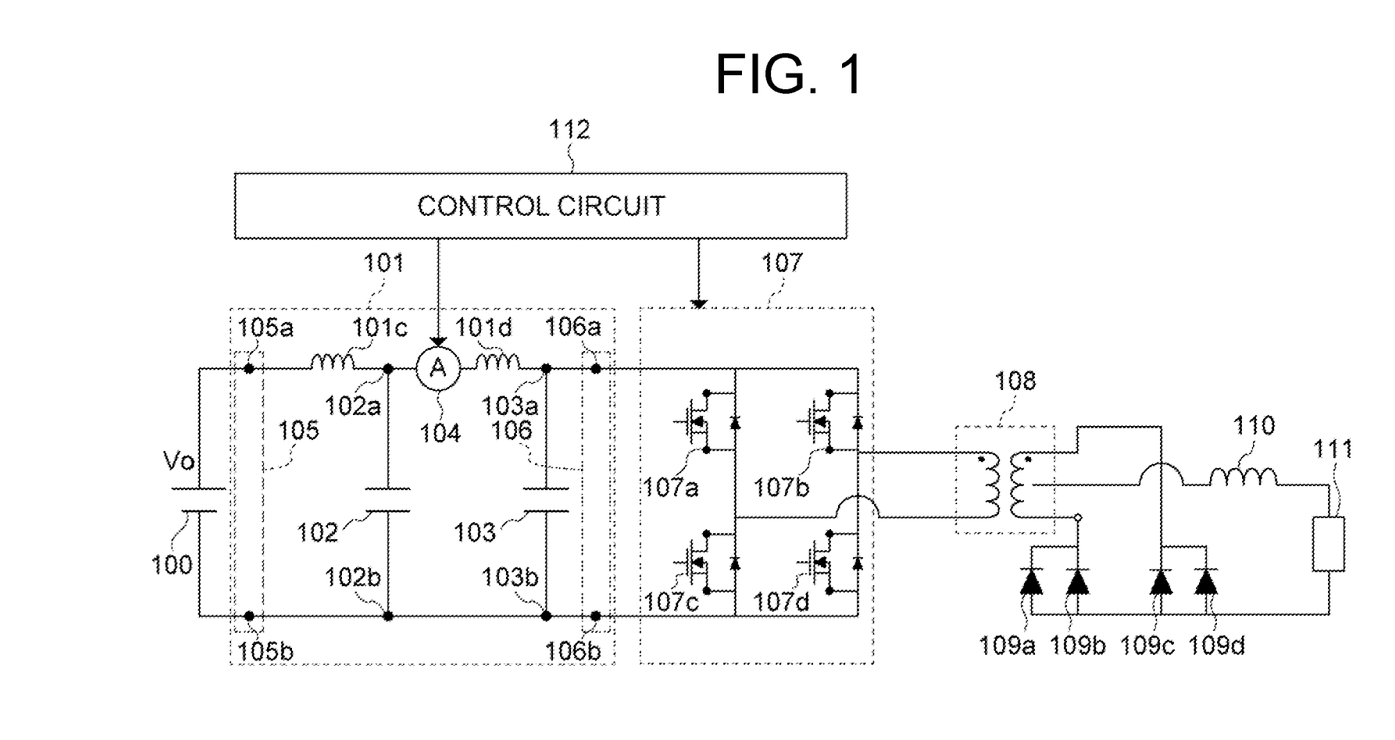
FIG. 1 is a circuit diagram for illustrating a power conversion apparatus according to a first embodiment of this disclosure.

FIG. 1 is a circuit diagram for illustrating a power conversion apparatus according to a first embodiment of this disclosure. The power conversion apparatus of FIG. 1 is what is called an insulated full-bridge DC/DC converter. The power conversion apparatus is included in an electric vehicle, for example.

The power conversion apparatus includes a circuit board 101, a first capacitor 102, a second capacitor 103, a current sensor 104, a power conversion unit 107, a transformer 108, four rectifier diodes 109*a*, 109*b*, 109*c*, and 109*d*, a smoothing reactor 110, and a control circuit 112. The power conversion apparatus steps down electric power from a DC power source 100, and supplies the stepped-down electric power to a load 111.

The circuit board 101 is provided between the DC power source 100 and the power conversion unit 107. The circuit board 101 includes an input section 105 and an output section 106. The electric power from the DC power source 100 is input to the input section 105.

The input section 105 has a first input terminal 105*a* and a second input terminal 105*b*. The first input terminal 105*a* is connected to a positive electrode of the DC power source 100. The second input terminal 105*b* is connected to a negative electrode of the DC power source 100.

The output section 106 has a first output terminal 106*a* and a second output terminal 106*b*. An electric current from the first input terminal 105*a* is caused to flow through the first output terminal 106*a*. The second output terminal 106*b* is connected to the second input terminal 105*b*.

The power conversion unit 107 is connected to the output section 106. Thus, the power conversion unit 107 is connected to the DC power source 100 via the circuit board 101. The power conversion unit 107 includes four power semiconductor elements 107*a*, 107*b*, 107*c*, and 107*d*. The power conversion unit 107 converts electric power input from the output section 106 with use of the four power semiconductor elements 107a, 107b, 107c, and 107d, and outputs the converted power to the transformer 108.

Each of the power semiconductor elements is a metal-oxide-semiconductor field-effect transistor (MOSFET). Further, a free wheeling diode is connected in antiparallel between a drain and a source of each power semiconductor element.

The first capacitor 102 is connected between a first connection point 102a and a second connection point 102b. The first connection point 102a is provided between the first input terminal 105a and the first output terminal 106a. The second connection point 102b is provided between the second input terminal 105b and the second output terminal 106b.

The first capacitor 102 is a capacitor for suppressing voltage vibration. A ceramic capacitor is used as the first capacitor 102. The term "voltage vibration" as used herein refers to vibration caused by a capacitive component including parasitic inductance in wiring around the power conversion unit 107 and the capacitors at times of switching the power semiconductor elements 107a to 107d.

The first capacitor 102 is a capacitor formed by a plurality of capacitors or a plurality of series capacitors connected in parallel to one another. A series capacitor is a capacitor formed by a plurality of capacitor components connected in series.

The second capacitor 103 is connected between a third connection point 103a and a fourth connection point 103b. The third connection point 103a is provided between the first connection point 102a and the first output terminal 106a. The fourth connection point 103b is provided between the second connection point 102b and the second output terminal 106b.

The second capacitor 103 is a capacitor for suppressing surge voltages and suppressing voltage vibration. A ceramic capacitor is used as the second capacitor. As with the first capacitor 102, the second capacitor 103 is also a capacitor in which a plurality of capacitors or a plurality of series capacitors are connected in parallel to one another.

The current sensor 104 is provided between the first connection point 102a and the third connection point 103a. Specifically, the current sensor 104 is provided near the first capacitor 102. The current sensor 104 detects the electric current flowing from the first input terminal 105a to the first output terminal 106a. A current sensor of a current transformer (CT) type is used as the current sensor 104. The current sensor 104 includes a primary winding and a secondary winding. One end of the primary winding is connected to the first connection point 102a, and the other end of the primary winding is connected to the third connection point 103a.

The transformer 108 includes a primary side coil and a secondary side coil. The transformer 108 steps down a voltage generated in the power conversion unit 107.

The four rectifier diodes 109a, 109b, 109c, and 109d each rectify a voltage output from the secondary side coil of the transformer 108.

The smoothing reactor 110 smooths the voltage output from the secondary side coil of the transformer 108 and an electric current output from the secondary side coil of the transformer 108, and supplies electric power obtained by smoothing the voltage and the electric current to the load 111.

The control circuit 112 generates control signals for controlling the respective power semiconductor elements of the power conversion unit 107 to be turned on/off, and outputs the generated control signals to the power conversion unit 107. Further, the control circuit 112 acquires the electric current detected by the current sensor 104 from the current sensor 104.

Further, wirings on the circuit board 101 have a first parasitic inductance 101c and a second parasitic inductance 101d as parasitic inductance caused by wiring patterns. The first parasitic inductance 101c is parasitic inductance present in a path from the first connection point 102a to the first input terminal 105a and a path from the second connection point 102b to the second input terminal 105b. The second parasitic inductance 101d is parasitic inductance present in a path from the first connection point 102a to the third connection point 103a and a path from the second connection point 102b to the fourth connection point 103b.

In this specification, a length of wiring from the first input terminal 105a to the first connection point 102a is defined as a first wiring length. A length of wiring from the second input terminal 105b to the second connection point 102b is defined as a second wiring length. A length of wiring from the first connection point 102a to the third connection point 103a is defined as a third wiring length. A length of wiring from the second connection point 102b to the fourth connection point 103b is defined as a fourth wiring length.

Then, in the circuit board 101 in the first embodiment, a sum of the third wiring length and the fourth wiring length is smaller than a sum of the first wiring length and the second wiring length.

Further, a magnitude of parasitic inductance is generally proportional to a length of wiring, and hence a value of the second parasitic inductance 101d becomes smaller than a value of the first parasitic inductance 101c.

The first capacitor 102 suppresses voltage vibration caused by the first parasitic inductance 101c. Thus, a capacitance value of the first capacitor 102 is set to a value with which the voltage vibration caused by the first parasitic inductance 101c can be sufficiently suppressed.

The second capacitor 103 suppresses voltage vibration caused by the second parasitic inductance 101d. Further, the second capacitor 103 suppresses a surge voltage caused by the first parasitic inductance 101c and a surge voltage caused by the second parasitic inductance 101d. Thus, a capacitance value of the second capacitor 103 is set to a value with which the voltage vibration caused by the second parasitic inductance 101d, the surge voltage caused by the first parasitic inductance 101c, and the surge voltage caused by the second parasitic inductance 101d can be sufficiently suppressed.

As described above, the second parasitic inductance 101d is smaller than the first parasitic inductance 101c, and hence the capacitance value of the second capacitor 103 can be set to a value that is smaller than the capacitance value of the first capacitor 102.

A capacitance value of a capacitor required to suppress the voltage vibration caused by the second parasitic inductance 101d is larger than a capacitance value of a capacitor required to suppress the surge voltage caused by the first parasitic inductance 101c and the surge voltage caused by the second parasitic inductance 101d. Consequently, it is only required that the capacitance value of the second capacitor 103 be set to a value with which the voltage vibration caused by the second parasitic inductance 101d can be suppressed.

Next, as a comparative example of the power conversion apparatus according to the first embodiment, a power conversion apparatus that does not include the first capacitor 102 is considered. Further, description is given of a difference between the capacitance value of the second capacitor 103 in the power conversion apparatus according to the first embodiment and the capacitance value of the second capacitor in the power conversion apparatus of the comparative example.

A circuit configuration of the power conversion apparatus of the comparative example is equivalent to a configuration obtained by removing the first capacitor 102 from the circuit illustrated in FIG. 1. Accordingly, in the power conversion apparatus of the comparative example, the first connection point 102a and the second connection point 102b do not exist either because of the circuit configuration. Further, in the power conversion apparatus of the comparative example, a capacitor corresponding to the second capacitor of FIG. 1 is called a smoothing capacitor for convenience.

Parasitic inductance of wiring in the circuit board of the power conversion apparatus of the comparative example is different from the first parasitic inductance 101c and the second parasitic inductance 101d of FIG. 1. In the power conversion apparatus of the comparative example, as a third parasitic inductance, there is parasitic inductance present in a path from the first input terminal 105a to the current sensor 104. Further, as a fourth parasitic inductance, there is parasitic inductance caused by a path from the current sensor 104 to the third connection point 103a and a path from the fourth connection point 103b to the second input terminal 105b.

The smoothing capacitor is arranged near the output section 106. As a result, the smoothing capacitor serves as a snubber circuit, and can suppress a surge voltage caused by parasitic inductance.

In the power conversion apparatus of the comparative example, it is required to suppress, by the smoothing capacitor, both of voltage vibration caused by the third parasitic inductance and voltage vibration caused by the fourth parasitic inductance. Accordingly, in order to suppress both of the voltage vibration caused by the third parasitic inductance and the voltage vibration caused by the fourth parasitic inductance, a capacitance value of the smoothing capacitor is set to a value that is larger than the capacitance value of the second capacitor 103.

For that reason, an electric current flowing through the second capacitor 103 becomes smaller than an electric current flowing through the smoothing capacitor. Consequently, as compared to the power conversion apparatus of the comparative example, the power conversion apparatus of FIG. 1 can reduce a large discrepancy between a measurement value of the current sensor 104 and a value of the electric current that actually flows through the power conversion unit 107.

Next, description is given of arrangement of the first capacitor 102, the second capacitor 103, and the current sensor 104 and the wiring patterns in the circuit board 101. As described above, the current sensor 104 is a sensor of a CT type, and hence it is required that the primary winding and the secondary winding of the current sensor 104 be electrically insulated.

In the circuit board 101, the first capacitor 102 and the second capacitor 103 are connected to the primary winding of the current sensor 104 via the wiring patterns. Thus, it is required to provide insulation distances between the secondary winding and the first capacitor 102 and between the secondary winding and the second capacitor 103.

For that reason, when all of the first capacitor 102, the second capacitor 103, and the current sensor 104 are to be arranged on the same surface of the circuit board 101, flexibility in wiring layout is reduced. As a result, there occurs a problem in that it is difficult to set the third wiring length and the fourth wiring length to be small.

Figure 2:
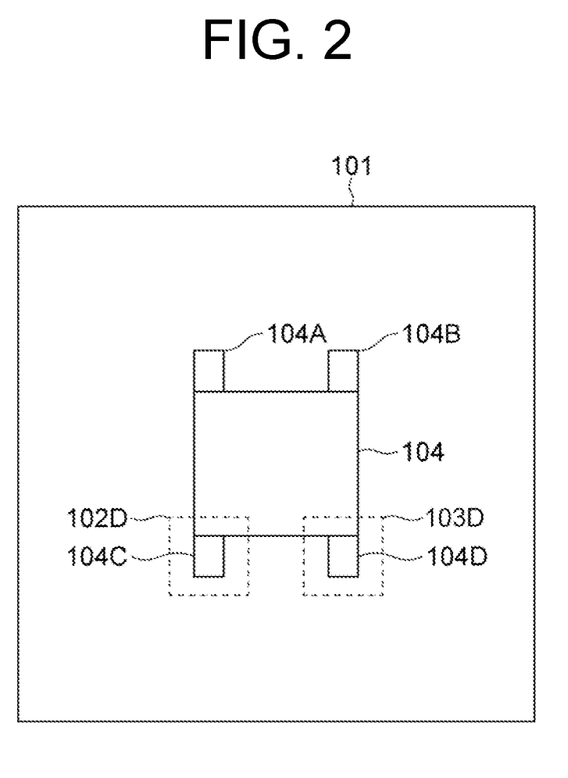
FIG. 2 is a top view for illustrating a circuit board of FIG. 1.
Figure 3:
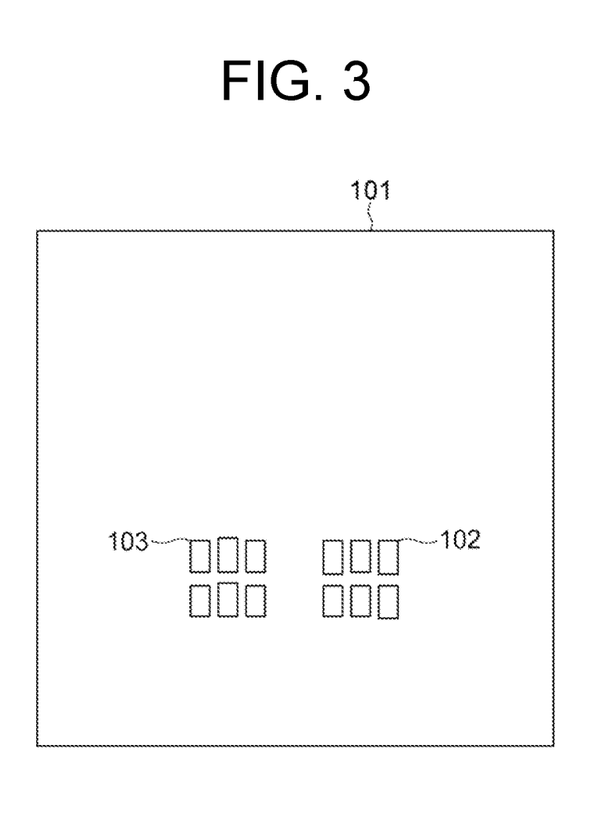
FIG. 3 is a bottom view for illustrating the circuit board of FIG. 1.

FIG. 2 is a top view for illustrating the circuit board 101 of FIG. 1. FIG. 3 is a bottom view for illustrating the circuit board 101 of FIG. 1. The circuit board 101 includes a first conductive layer, a second conductive layer, and an insulating substrate. The insulating substrate is interposed between the first conductive layer and the second conductive layer. A surface of the first conductive layer is a first surface of the circuit board 101, and a surface of the second conductive layer is a second surface of the circuit board 101.

FIG. 2 shows the first surface of the circuit board 101, and FIG. 3 shows the second surface, which is a surface on a side opposite to the first surface. The current sensor 104 is arranged on the first surface of the circuit board 101. On the first surface, four wiring patterns 104A, 104B, 104C, and 104D are formed at four corners of the current sensor 104.

Two wiring patterns 104A and 104B are connected to the primary winding in the current sensor 104. Two wiring patterns 104C and 104D are connected to the secondary winding in the current sensor 104.

The first capacitor 102 and the second capacitor 103 are arranged as second surface capacitors on the second surface of the circuit board 101. A region 102D is a region in which the first capacitor 102 is arranged on the second surface. A region 103D is a region in which the second capacitor 103 is arranged on the second surface.

The first capacitor 102 and the second capacitor 103 are electrically connected to the primary winding of the current sensor 104 via the two wiring patterns 104A and 104B. Thus, it is required that the first capacitor 102 and the second capacitor 103 be electrically insulated from the two wiring patterns 104C and 104D.

The current sensor 104 and the wiring pattern 104C overlap the first capacitor 102 in a normal direction of the first surface of the circuit board 101. The current sensor 104 and the wiring pattern 104C are electrically insulated from the first capacitor 102 by an insulating layer of the circuit board 101.

Further, the current sensor 104 and the wiring pattern 104D overlap the second capacitor 103 in the normal direction of the first surface of the circuit board 101. The current sensor 104 and the wiring pattern 104D are electrically insulated from the second capacitor 103 by the insulating layer of the circuit board 101.

As described above, the second surface capacitors are arranged on a surface on a side opposite to a surface of the circuit board 101 on which the current sensor 104 is arranged. Further, in the normal direction of the circuit board 101, portions of the current sensor 104 overlap portions of the capacitors arranged on the surface opposite to the surface on which the current sensor 104 is arranged. Then, insulation between the secondary winding of the current sensor 104 arranged on the first surface and the capacitor components arranged on the second surface is secured by the insulating layer of the circuit board 101.

A second surface capacitor is at least one capacitor of the first capacitor 102 or the second capacitor 103.

As described above, the power conversion apparatus according to the first embodiment includes the first input terminal 105a, the second input terminal 105b, the first output terminal 106a, and the second output terminal 106b. The power conversion apparatus according to the first embodiment also includes the power conversion unit 107, the current sensor 104, the first capacitor 102, and the second capacitor 103.

The power conversion unit 107 is connected to the first output terminal 106a and the second output terminal 106b. The current sensor 104 detects the electric current flowing from the first input terminal 105a to the first output terminal 106a.

The first capacitor 102 is connected between the first connection point 102a and the second connection point 102b. The first connection point 102a is provided between the first input terminal 105a and the first output terminal 106a. The second connection point 102b is connected between the second input terminal 105b and the second output terminal 106b.

The second capacitor 103 is connected between the third connection point 103a and the fourth connection point 103b. The third connection point 103a is provided between the first connection point 102a and the power conversion unit 107. The fourth connection point 103b is provided between the second connection point 102b and the power conversion unit 107.

The current sensor 104 is provided between the first connection point 102a and the third connection point 103a.

In this specification, the length of wiring from the first input terminal 105a to the first connection point 102a is defined as the first wiring length. The length of wiring from the second input terminal 105b to the second connection point 102b is defined as the second wiring length. The length of wiring from the first connection point 102a to the third connection point 103a is defined as the third wiring length. The length of wiring from the second connection point 102b to the fourth connection point 103b is defined as the fourth wiring length. In this case, the sum of the third wiring length and the fourth wiring length is smaller than the sum of the first wiring length and the second wiring length.

With this configuration, the capacitance value of the first capacitor 102 is set to a value with which the voltage vibration caused by the first parasitic inductance 101c can be suppressed. The capacitance value of the second capacitor 103 is set to a value with which the voltage vibration caused by the second parasitic inductance 101d, the surge voltage caused by the first parasitic inductance 101c, and the surge voltage caused by the second parasitic inductance 101d can be suppressed.

As described above, the sum of the third wiring length and the fourth wiring length is smaller than the sum of the first wiring length and the second wiring length. Thus, the second parasitic inductance 101d becomes smaller than the first parasitic inductance 101c. In this manner, with the provision of the first capacitor 102 and the second capacitor 103 on stages prior to and subsequent to the current sensor 104, respectively, the capacitance value of the second capacitor 103 can be set to a value that is smaller than the capacitance value of the smoothing capacitor of the comparative example.

Consequently, according to the power conversion apparatus of the first embodiment, a reduction in accuracy of measuring the electric current flowing through the power conversion unit 107 can be suppressed. Further, the effect of suppressing the surge voltages and the effect of suppressing voltage vibration can also be maintained.

In the power conversion apparatus according to the first embodiment, it is more preferred when a ratio of the sum of the third wiring length and the fourth wiring length to the sum of the first wiring length and the second wiring length becomes smaller.

For example, consideration is given to a case in which the current sensor 104 is moved on wiring from the first input terminal 105a to the first output terminal 106a in a direction in which the current sensor 104 becomes closer to the first output terminal 106a. Further, in this case, the first connection point 102a and the second connection point 102b are moved in a direction in which the first connection point 102a and the second connection point 102b become closer to the first output terminal 106a and the second output terminal 106b, respectively.

In this case, the first wiring length and the second wiring length become longer, and the third wiring length and the fourth wiring length become shorter. Thus, although the value of the first parasitic inductance 101c is increased, the capacitance value of the first capacitor 102 can be increased in accordance with the increase in value of the first parasitic inductance 101c to suppress the voltage vibration caused by the first parasitic inductance 101c.

Meanwhile, the capacitance value of the second capacitor 103 can be reduced by the increase in capacitance value of the first capacitor 102. Consequently, the reduction in accuracy of measuring the electric current flowing through the power conversion unit 107 can be further suppressed.

Further, the capacitance value of the second capacitor 103 is smaller than the capacitance value of the first capacitor 102. Consequently, the reduction in accuracy of measuring the electric current flowing through the power conversion unit 107 can be further suppressed.

Still further, a ceramic capacitor is used as each of the first capacitor 102 and the second capacitor 103. A ceramic capacitor is more compact than an aluminum electrolytic capacitor and a film capacitor. Thus, an area in which a ceramic capacitor occupies the circuit board 101 is smaller than an area in which each of an aluminum electrolytic capacitor and a film capacitor occupies the circuit board 101.

For that reason, with use of a ceramic capacitor as each of the first capacitor 102 and the second capacitor 103, component layout flexibility in the circuit board 101 is increased. Consequently, the third wiring length and the fourth wiring length can be further reduced. In other words, the reduction in accuracy of measuring the electric current flowing through the power conversion unit 107 can be further suppressed.

Further, in the first embodiment, a ceramic capacitor has been used as the first capacitor 102, but an aluminum electrolytic capacitor may be used as the first capacitor 102. At least with use of a ceramic capacitor as the second capacitor 103, the third wiring length and the fourth wiring length can be reduced.

When the first parasitic inductance 101c has a relatively high value under constraints of the wiring layout, the voltage vibration caused by the first parasitic inductance 101c becomes larger. Further, when the first parasitic inductance 101c has a relatively high value, a peak of the surge voltage caused by the first parasitic inductance 101c and a peak of the surge voltage caused by the second parasitic inductance 101d become higher.

Consequently, in order to suppress the voltage vibration and the surge voltages, it is required to use a capacitor having a large capacitance as each of the first capacitor 102 and the second capacitor 103, and hence there occur problems in that a volume of each capacitor is increased, and the power conversion apparatus is increased in size.

A capacitance density of an aluminum electrolytic capacitor is higher than a capacitance density of a ceramic capacitor, and hence, with use of an aluminum electrolytic capacitor as the first capacitor 102, the increase in volume accompanying the increase in capacitance can be suppressed. Meanwhile, with use of a ceramic capacitor having excellent frequency characteristics as the second capacitor 103, a high effect of suppressing the surge voltages can be obtained.

As a result, the capacitor volumes can be reduced while suppressing the voltage vibration and suppressing the surge voltages, and hence the power conversion apparatus can be downsized.

Further, in the first embodiment, a ceramic capacitor has been used as the first capacitor 102, but a film capacitor may be used as the first capacitor 102. At least with use of a ceramic capacitor as the second capacitor 103, the third wiring length and the fourth wiring length can be reduced.

As with an aluminum electrolytic capacitor, a capacitance density of a film capacitor is higher than a capacitance density of a ceramic capacitor. Consequently, with use of a film capacitor as the first capacitor 102, the increase in volume accompanying the increase in capacitance can be suppressed. Meanwhile, with use of a ceramic capacitor having excellent frequency characteristics as the second capacitor, a high effect of suppressing the surge voltages can be obtained.

As a result, the capacitor volumes can be reduced while suppressing the voltage vibration and suppressing the surge voltages, and hence the power conversion apparatus can be downsized.

Further, the circuit board 101 has the first surface and the second surface on the side opposite to the first surface. The current sensor 104 is arranged on the first surface of the circuit board 101, and the second surface capacitors are arranged on the second surface. A second surface capacitor is at least one of the first capacitor 102 or the second capacitor 103. In addition, at least a part of the second surface capacitor is overlapped with the current sensor 104 in the normal direction of the first surface.

With this configuration, the capacitors arranged on the surface on the side opposite to the surface on which the current sensor 104 is arranged can be arranged in the vicinity of the secondary winding of the current sensor 104. Consequently, the flexibility in wiring layout in the circuit board 101 is increased, and the third wiring length and the fourth wiring length can be set to be small.

Further, a rated ripple current of the first capacitor 102 may be larger than a rated ripple current of the second capacitor 103. In other words, a high allowed ripple ceramic capacitor may be used as the first capacitor 102.

The first capacitor 102 is increased in capacitance in order to suppress the voltage vibration caused by the first parasitic inductance. Thus, a relatively large electric current flows through the first capacitor 102. When a capacitor having a low rated ripple current is used as the first capacitor 102, it is required to increase the number of the plurality of capacitor components constituting the first capacitor 102 to reduce an electric current flowing through one capacitor component. In other words, when a capacitor having a low rated ripple current is used, the number of the plurality of capacitor components is increased, and cost of the power conversion apparatus is increased as a result.

Further, the value of the first parasitic inductance 101c is high, and hence the surge voltage caused by the first parasitic inductance 101c and the surge voltage caused by the second parasitic inductance 101d also become higher. Then, the second capacitor 103 is increased in capacitance, and there is a fear in that a large discrepancy may occur between the measurement value of the current sensor 104 and the value of the electric current that actually flows through the power conversion unit 107.

Thus, with use of a capacitor having a large rated ripple current as the first capacitor 102, the first capacitor 102 can satisfy the rated ripple current with a relatively small number of components connected in series. In other words, an increase in number of capacitor components can be suppressed.

Further, an equivalent series resistance (ESR) of the second capacitor 103 may be lower than an equivalent series resistance of the first capacitor 102. In other words, a ceramic capacitor having a low equivalent series resistance may be used as the second capacitor 103.

As described above, with use of a low-ESR capacitor having superior frequency characteristics as the second capacitor 103, a high effect of suppressing the surge voltages can be obtained without increasing the capacitance of the second capacitor 103. Consequently, the capacitance of the second capacitor 103 can be reduced while suppressing an increase in cost of the first capacitor 102.

Second Embodiment

Figure 4:
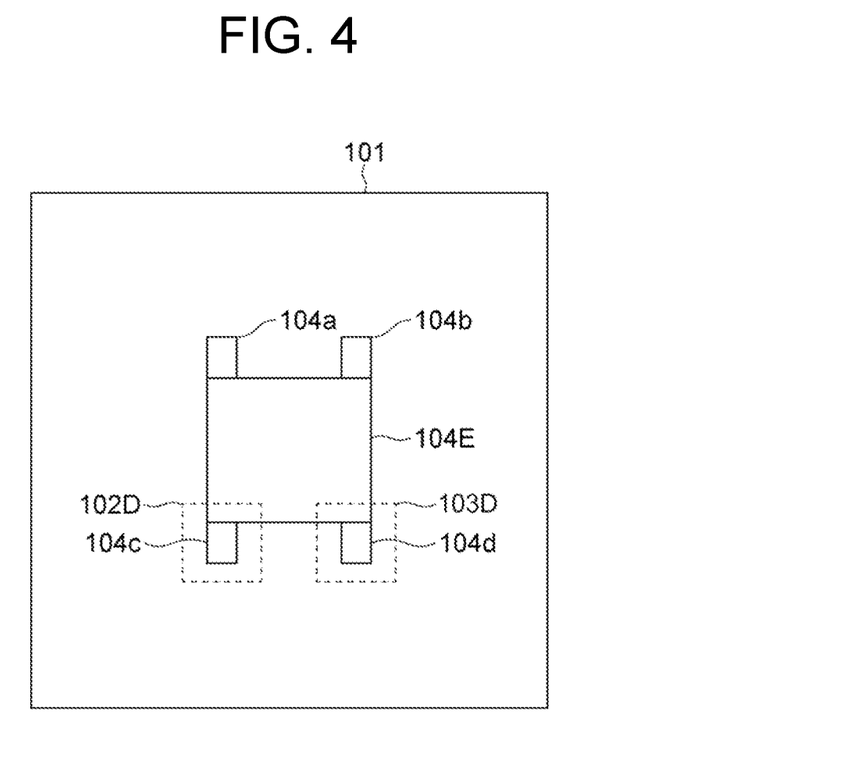
FIG. 4 is a top view for illustrating a circuit board of a power conversion apparatus according to a second embodiment of this disclosure.
Figure 5:
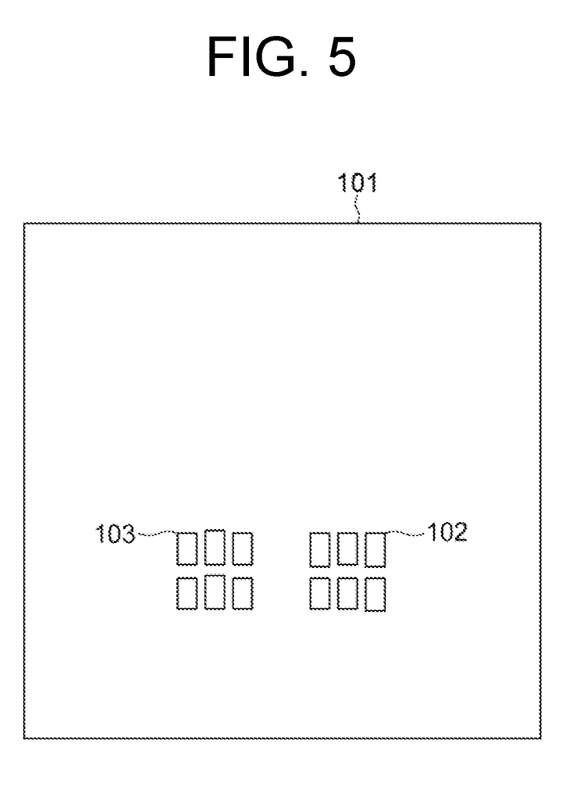
FIG. 5 is a bottom view for illustrating the circuit board of the power conversion apparatus according to the second embodiment.

Next, a power conversion apparatus according to a second embodiment of this disclosure is described. In the power conversion apparatus according to the second embodiment, a current sensor formed of a Hall element is used as the current sensor 104. The power conversion apparatus according to the second embodiment is similar to the power conversion apparatus according to the first embodiment in the other components except that the current sensor formed of a Hall element is used as the current sensor 104.

FIG. 4 is a top view for illustrating a circuit board 101 of the power conversion apparatus according to the second embodiment. FIG. 5 is a bottom view for illustrating the circuit board 101 of the power conversion apparatus according to the second embodiment. The circuit board 101 includes a first conductive layer, a second conductive layer, and an insulating substrate. The insulating substrate is interposed between the first conductive layer and the second conductive layer. A surface of the first conductive layer is a first surface of the circuit board 101, and a surface of the second conductive layer is a second surface of the circuit board 101.

FIG. 4 shows the first surface of the circuit board 101, and FIG. 5 shows the second surface, which is a surface on a side opposite to the first surface. A current sensor 104E is arranged on the first surface of the circuit board 101. On the first surface, four wiring patterns 104a, 104b, 104c, and 104d are formed at four corners of the current sensor 104E.

Two wiring patterns 104a and 104b are connected to a primary conductor in the current sensor 104E. Two wiring patterns 104c and 104d output a voltage corresponding to an electric current flowing through the primary conductor in the current sensor 104E.

The first capacitor 102 and the second capacitor 103 are arranged as second surface capacitors on the second surface of the circuit board 101. A region 102D is a region in which the first capacitor 102 is arranged on the second surface. A region 103D is a region in which the second capacitor 103 is arranged on the second surface.

The first capacitor 102 and the second capacitor 103 are electrically connected to the primary conductor of the current sensor 104E via the two wiring patterns 104a and 104b. Thus, it is required that the first capacitor 102 and the second capacitor 103 be electrically insulated from the two wiring patterns 104c and 104d.

The current sensor 104E and the wiring pattern 104c overlap the first capacitor 102 in a normal direction of the first surface of the circuit board 101. The current sensor 104E and the wiring pattern 104c are electrically insulated from the first capacitor 102 by an insulating layer of the circuit board 101.

Further, the current sensor 104E and the wiring pattern 104d overlap the second capacitor 103 in the normal direction of the first surface of the circuit board 101. The current sensor 104E and the wiring pattern 104d are electrically insulated from the second capacitor 103 by the insulating layer of the circuit board 101.

As described above, according to the power conversion apparatus of the second embodiment, the circuit board 101 has the first surface and the second surface, which is a surface on the side opposite to the first surface. The current sensor 104E is arranged on the first surface of the circuit board 101, and the second surface capacitors are arranged on the second surface. A second surface capacitor is at least one of the first capacitor 102 or the second capacitor 103. In addition, at least a part of the second surface capacitor is overlapped with the current sensor 104E in the normal direction of the first surface.

With this configuration, the capacitors arranged on the second surface can be arranged in the vicinity of an output wiring pattern of the current sensor 104E. Consequently, the flexibility in wiring layout in the circuit board 101 is increased, and the third wiring length and the fourth wiring length can be set to be small.

In the first and second embodiments, a MOSFET has been used as each of the power semiconductor elements, but another power semiconductor element, for example, an insulated gate bipolar transistor (IGBT), may be used instead of a MOSFET.

Further, in the first and second embodiments, the first input terminal 105a and the second input terminal 105b have been connected to the DC power source 100, but the first input terminal 105a and the second input terminal 105b may be connected to an AC power source via a rectifier circuit.

What is claimed is:

1. A power conversion apparatus, comprising:
   a first input terminal;
   a second input terminal;
   a first output terminal;
   a second output terminal;
   a power converter connected to the first output terminal and the second output terminal;
   a current sensor to detect an electric current flowing from the first input terminal to the first output terminal;
   a first capacitor connected between a first connection point and a second connection point, the first connection point being provided between the first input terminal and the first output terminal, the second connection point being provided between the second input terminal and the second output terminal; and
   a second capacitor connected between a third connection point and a fourth connection point, the third connection point being provided between the first connection point and the first output terminal, the fourth connection point being provided between the second connection point and the second output terminal,
   the current sensor being provided between the first connection point and the third connection point,
   when a length of wiring from the first input terminal to the first connection point is defined as a first wiring length, a length of wiring from the second input terminal to the second connection point is defined as a second wiring length, a length of wiring from the first connection point to the third connection point is defined as a third wiring length, and a length of wiring from the second connection point to the fourth connection point is defined as a fourth wiring length, a sum of the third wiring length and the fourth wiring length being smaller than a sum of the first wiring length and the second wiring length.

2. The power conversion apparatus according to claim 1, wherein the second capacitor has a capacitance value that is smaller than a capacitance value of the first capacitor.

3. The power conversion apparatus according to claim 1, wherein a ceramic capacitor is used as each of the first capacitor and the second capacitor.

4. The power conversion apparatus according to claim 1, wherein an aluminum electrolytic capacitor is used as the first capacitor, and a ceramic capacitor is used as the second capacitor.

5. The power conversion apparatus according to claim 1, wherein a film capacitor is used as the first capacitor, and a ceramic capacitor is used as the second capacitor.

6. The power conversion apparatus according to claim 1, further comprising a circuit board,
   wherein the circuit board has a first surface and a second surface, the second surface being a surface on a side opposite to the first surface,
   wherein the current sensor is arranged on the first surface,
   wherein a second surface capacitor, which is at least one of the first capacitor or the second capacitor, is arranged on the second surface, and
   wherein at least a part of the second surface capacitor overlaps the current sensor in a normal direction of the first surface.

7. The power conversion apparatus according to claim 3, wherein the first capacitor has a rated ripple current that is larger than a rated ripple current of the second capacitor.

8. The power conversion apparatus according to claim 3, wherein the second capacitor has an equivalent series resistance that is lower than an equivalent series resistance of the first capacitor.

* * * * *